UNITED STATES PATENT OFFICE.

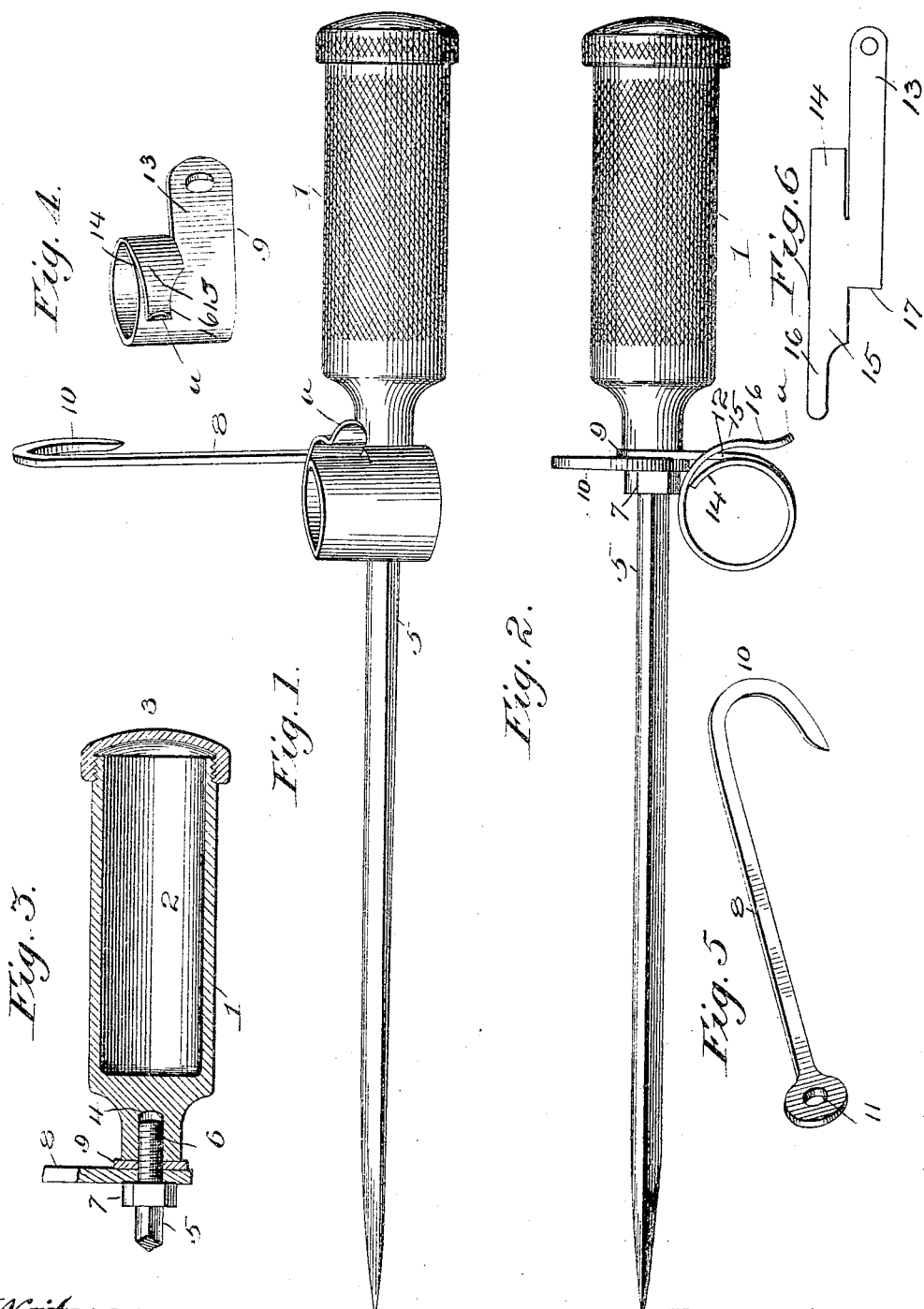

JOHN B. LINDAHL, OF COLORADO SPRINGS, COLORADO.

COMBINATION MINER'S CANDLESTICK AND MATCH-SAFE.

No. 801,465.

Specification of Letters Patent.

Patented Oct. 10, 1905.

Application filed October 21, 1904. Serial No. 229,401.

*To all whom it may concern:*

Be it known that I, JOHN B. LINDAHL, a citizen of the United States, residing at Colorado Springs, in the county of El Paso and State of Colorado, have invented certain new and useful Improvements in a Combination Miner's Candlestick and Match-Safe, of which the following is a specification.

The invention relates to certain new and useful improvements in a combined miner's candlestick and match-safe.

The object of the invention is the provision of laterally adjustable and reversible supporting means removably assembled with the other parts of a combined candlestick and match-safe.

Another object of the invention is the improvement of the construction of an adjustable and removable candle-support.

A still further object of the invention is the provision of a miner's candlestick which is capable of receiving matches.

With these and other objects in view the invention consists of certain other novel constructions, combinations, and arrangements of parts, as will be hereinafter more fully described, illustrated in the accompanying drawings, and more particularly pointed out in the claims hereto appended.

In the drawings, Figure 1 is a view in side elevation of a complete device. Fig. 2 is a top plan view of the device depicted in Fig. 1. Fig. 3 is a longitudinal sectional view of a handle portion of a device adapted to receive matches, showing a fragmentary view of the removable spear or stick, an adjustable and reversible hook, and a candle-support, partially in section, in their assembled position with the handle portion. Fig. 4 is an isometric perspective view of the candle-supporting member. Fig. 5 is a perspective view of the adjustable and reversible hook. Fig. 6 is a plan view of the sheet constituting the candle-supporting member.

Referring to the drawings by numerals, 1 indicates the handle of a combined candlestick and match-safe. The handle is hollowed for producing a compartment or receptacle 2, which is closed at one end by means of a removable cap 3. Formed in the opposite end of the handle 1 to that carrying the cap 3 is a screw-threaded recess 4, which is provided for furnishing means whereby the removable stick or spear member 5, which is provided with a screw-threaded end 6, may be adjustably secured to the handle portion 1. It will be obvious that the stick 5 is provided with a head or shouldered portion 7, which provides a greater bearing-surface for engaging the laterally-adjustable hook 8 or the adjustable candle-supporting member 9. It will be apparent upon considering the drawings that the candle-supporting member 9 may be positioned against the head 7 upon the threaded extension 6 of the stick or spear 5 and the hook 8 positioned upon threaded portion 6 between the candle-supporting member 9 and the handle 1 of the combined candle-supporting device and match-safe.

The adjustable and reversible hook 8 comprises an approximately straight body portion provided with an angular end 10 and an apertured end 11. The candle-supporting member 9 is formed from a blank sheet of material, which is slitted at 12, producing a comparatively long apertured portion 13 and a parallel short portion 14. Extending from the opposite end of member 9 to that of portion 14 is a tongue 15, which is provided with a tapering end 16. The tapering end 16 is adapted to be bent outwardly, as clearly seen in Fig. 4, when the sheet is folded for providing a suitable surface which may be grasped when it is desired to adjust the position of the candle-supporting member. When the sheet is folded, the straight edge 17 bears against the apertured tongue or portion 13, and the short tongue or portion 14 of the member 9 engages the tongue 15, as is clearly seen in Fig. 2. It will be obvious that owing to this structure an exceedingly-simple candle-supporting member is produced which may be adjusted to different sizes by increasing or decreasing the diameter thereof. This may be accomplished by separating the folded sheet of material, the tongue 14 being caused to engage the tongue 15 at all times. After the candle-supporting member has been positioned upon the threaded extension 6 of the stick or spear 5 the same may be vertically adjusted thereon and secured in such adjusted position by tightening the handle constituting the match-safe of the combined candlestick and match-safe upon the threaded extension 6 of said stick.

The adjustable and reversible hook 8 may be adjusted and secured firmly at any angle desired, thus permitting the hanging or location of the same on rocky or other projections of varying sizes and angles and, further, permitting said hook to be affixed to such other parts with the point of the hook turned either to the left hand or right hand of the handle and spear, as may be desirable and necessary for the use of the person operating with said candlestick.

The handle portion of the device provides a hollow water-tight compartment or receptacle 2, which is essential in producing a complete device. Furthermore, the peculiarly-constructed candle-supporting member 9 is also of great utility, as the diameter of the candle-socket may be easily adjusted by reason of the structure of member 9 permitting of the separation of a folded sheet of material or, if it is necessary, to closing the same, decreasing the diameter of the candle-receiving socket of said member. The stick or spear member 5 is preferably tapered throughout its entire length, terminating in a sharp point, which facilitates the insertion of said stick or spear member 5 into cracks or crevices or, if it is desired, into the body of a suitable surface.

While I have described in the foregoing description and illustrated in the accompanying drawings the preferred form of my invention, it will be obvious to one versed in the art to which this invention relates that certain alterations, modifications, and changes may be made, and I therefore reserve the right to make such alterations, modifications, and changes as shall fairly fall within the spirit and scope of the present invention.

Having thus fully described my invention, what I claim as new, and desire to secure by Letters Patent, is—

1. In a miner's candlestick, the combination of a hollow handle, constituting a match-case, a removable cap inclosing one end of said handle, the opposite end of said handle provided with a threaded recess, a spear removably positioned within said recess, a hook carried by said spear, and a candle-supporting member carried by said spear comprising a folded sheet of material provided with a slitted end producing tongues of different lengths and of substantially the same width, one of said tongues provided with an aperture, the opposite end of said sheet provided with a tongue having a tapering end and a body portion of the same width as the unapertured tongue formed upon the opposite end.

2. In a miner's candlestick, the combination of a hollow handle, constituting a match-safe, a removable cap inclosing one end of said handle, the opposite end of said handle reduced in thickness and provided with a threaded recess, a removable spear positioned within said recess, a hook supported by said spear and handle, a candle-supporting member carried by said spear and handle, said member comprising a body portion provided with an apertured tongue extending at right angles from the lower portion of said body portion, and said body portion provided with overlapping upper tongues, one of said tongues provided with an end extending at an angle to said apertured tongue.

3. In a miner's candlestick, the combination of a hollow handle provided with a penetrating-point, said handle constituting a match-safe, a cap closing one end of said handle, a removable hook supported upon said handle, and a candle-supporting member carried by said handle, said member comprising a single sheet of metallic material, said sheet provided with tongues of different lengths formed upon one end, and a single tongue formed upon the other end, of the same width as one of said tongues.

4. In a miner's candlestick, the combination of a match-receiving receptacle provided with a penetrating-point, a removable hook assembled with said receptacle, and a candle-supporting member carried by said receptacle, comprising a body portion provided with tongues of different lengths, some of said tongues overlapping and lying in substantially parallel position, and another tongue projecting at substantially right angles from said body portion and the other tongues.

In testimony whereof I affix my signature in presence of two witnesses.

JOHN B. LINDAHL.

Witnesses:
R. R. HOLLAND,
J. F. SANFORD.